(12) United States Patent
Sill et al.

(10) Patent No.: US 9,025,284 B1
(45) Date of Patent: May 5, 2015

(54) DISK DRIVE WITH SELF SEALING SCREW ATTACHMENT OF ACTUATOR PIVOT

(71) Applicant: Western Digital Technologies, Inc., Irvine, CA (US)

(72) Inventors: Kevin R. Sill, San Jose, CA (US); Aaron D. Little, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/280,358

(22) Filed: May 16, 2014

Related U.S. Application Data

(60) Provisional application No. 61/944,647, filed on Feb. 26, 2014.

(51) Int. Cl.
*G11B 33/14* (2006.01)

(52) U.S. Cl.
CPC .................................. *G11B 33/1466* (2013.01)

(58) Field of Classification Search
CPC ... G11B 5/4813; G11B 33/1466; G11B 33/12
USPC .......... 360/97.02, 97.12, 97.22, 99.07, 99.08, 360/99.16, 99.21, 265.6, 265.7
See application file for complete search history.

(56) References Cited

U.S. PATENT DOCUMENTS

| | | | |
|---|---|---|---|
| 3,050,080 A | 8/1962 | Pagano | |
| 4,754,353 A * | 6/1988 | Levy | 360/265.6 |
| 4,875,120 A * | 10/1989 | Takahashi et al. | 360/267.7 |
| 5,235,482 A | 8/1993 | Schmitz | |
| 5,452,156 A | 9/1995 | Uda et al. | |
| 5,627,702 A * | 5/1997 | Kelemen et al. | 360/265.6 |
| 6,046,889 A | 4/2000 | Berding et al. | |
| 6,052,890 A | 4/2000 | Malagrino, Jr. et al. | |
| 6,061,206 A | 5/2000 | Foisy et al. | |
| 6,101,876 A | 8/2000 | Brooks et al. | |
| 6,147,831 A | 11/2000 | Kennedy et al. | |
| 6,151,189 A | 11/2000 | Brooks | |
| 6,151,197 A | 11/2000 | Larson et al. | |
| 6,185,067 B1 | 2/2001 | Chamberlain | |
| 6,185,074 B1 | 2/2001 | Wang et al. | |
| 6,208,486 B1 | 3/2001 | Gustafson et al. | |
| 6,215,616 B1 | 4/2001 | Phan et al. | |
| 6,256,173 B1 * | 7/2001 | Chee et al. | 360/265.7 |
| 6,272,694 B1 | 8/2001 | Knoth | |
| 6,288,866 B1 | 9/2001 | Butler et al. | |
| 6,292,333 B1 | 9/2001 | Blumentritt et al. | |
| 6,344,950 B1 | 2/2002 | Watson et al. | |
| 6,349,464 B1 | 2/2002 | Codilian et al. | |
| 6,388,873 B1 | 5/2002 | Brooks et al. | |
| 6,417,979 B1 | 7/2002 | Patton, III et al. | |
| 6,421,208 B1 | 7/2002 | Oveyssi | |

(Continued)

*Primary Examiner* — Angel Castro

(57) ABSTRACT

A disk drive enclosure includes a cover and a base having a first hole therethrough. A head actuator is pivotably attached to the base by an actuator pivot bearing having a pivot bearing shaft with a lower internally threaded section and a flat annular support surface that is facing and in preloaded contact with a flat mating surface of the disk drive base around the first hole. A bearing member is disposed around the pivot bearing shaft and between the pivot bearing shaft and the bore of the actuator. A first screw has an externally threaded section that is engaged with the lower internally threaded section of the pivot bearing shaft. The first screw has a screw head with an external annular seating surface in contact with and forming a continuous annular seal with an internal annular seating surface of the first hole.

14 Claims, 4 Drawing Sheets

(56) References Cited

U.S. PATENT DOCUMENTS

| | | | |
|---|---|---|---|
| 6,441,998 B1 | 8/2002 | Abrahamson | |
| 6,462,914 B1 | 10/2002 | Oveyssi et al. | |
| 6,466,398 B1 | 10/2002 | Butler et al. | |
| 6,469,871 B1 | 10/2002 | Wang | |
| 6,487,053 B1 * | 11/2002 | Matsumura et al. | 360/265.7 |
| 6,502,300 B1 | 1/2003 | Casey et al. | |
| 6,519,116 B1 | 2/2003 | Lin et al. | |
| 6,525,910 B1 * | 2/2003 | Macpherson et al. | 360/265.6 |
| 6,529,345 B1 | 3/2003 | Butler et al. | |
| 6,529,351 B1 | 3/2003 | Oveyssi et al. | |
| 6,535,358 B1 | 3/2003 | Hauert et al. | |
| 6,545,382 B1 | 4/2003 | Bennett | |
| 6,549,381 B1 | 4/2003 | Watson | |
| 6,560,065 B1 | 5/2003 | Yang et al. | |
| 6,571,460 B1 | 6/2003 | Casey et al. | |
| 6,574,073 B1 | 6/2003 | Hauert et al. | |
| 6,580,574 B1 | 6/2003 | Codilian | |
| 6,594,111 B1 | 7/2003 | Oveyssi et al. | |
| 6,603,620 B1 | 8/2003 | Berding | |
| 6,618,222 B1 | 9/2003 | Watkins et al. | |
| 6,624,966 B1 | 9/2003 | Ou-Yang et al. | |
| 6,624,980 B1 | 9/2003 | Watson et al. | |
| 6,624,983 B1 | 9/2003 | Berding | |
| 6,628,473 B1 | 9/2003 | Codilian et al. | |
| 6,644,362 B2 | 11/2003 | Bernett | |
| 6,654,200 B1 | 11/2003 | Alexander et al. | |
| 6,657,811 B1 | 12/2003 | Codilian | |
| 6,661,597 B1 | 12/2003 | Codilian et al. | |
| 6,661,603 B1 | 12/2003 | Watkins et al. | |
| 6,674,600 B1 | 1/2004 | Codilian et al. | |
| 6,690,637 B1 | 2/2004 | Codilian | |
| 6,693,767 B1 | 2/2004 | Butler | |
| 6,693,773 B1 | 2/2004 | Sassine | |
| 6,697,217 B1 | 2/2004 | Codilian | |
| 6,698,286 B1 | 3/2004 | Little et al. | |
| 6,700,736 B1 | 3/2004 | Wu et al. | |
| 6,704,167 B1 | 3/2004 | Scura et al. | |
| 6,707,637 B1 | 3/2004 | Codilian et al. | |
| 6,707,641 B1 | 3/2004 | Oveyssi et al. | |
| 6,710,980 B1 | 3/2004 | Hauert et al. | |
| 6,710,981 B1 | 3/2004 | Oveyssi et al. | |
| 6,728,062 B1 | 4/2004 | Ou-Yang et al. | |
| 6,728,063 B1 | 4/2004 | Gustafson et al. | |
| 6,731,470 B1 | 5/2004 | Oveyssi | |
| 6,735,033 B1 | 5/2004 | Codilian et al. | |
| 6,741,428 B1 | 5/2004 | Oveyssi | |
| 6,751,051 B1 | 6/2004 | Garbarino | |
| 6,754,042 B1 | 6/2004 | Chiou et al. | |
| 6,757,132 B1 | 6/2004 | Watson et al. | |
| 6,759,784 B1 | 7/2004 | Gustafson et al. | |
| 6,781,780 B1 | 8/2004 | Codilian | |
| 6,781,787 B1 | 8/2004 | Codilian et al. | |
| 6,781,791 B1 | 8/2004 | Griffin et al. | |
| 6,790,066 B1 | 9/2004 | Klein | |
| 6,791,791 B1 | 9/2004 | Alfred et al. | |
| 6,791,801 B1 | 9/2004 | Oveyssi | |
| 6,795,262 B1 | 9/2004 | Codilian et al. | |
| 6,798,603 B1 | 9/2004 | Singh et al. | |
| 6,801,389 B1 | 10/2004 | Berding et al. | |
| 6,801,404 B1 | 10/2004 | Oveyssi | |
| 6,816,342 B1 | 11/2004 | Oveyssi | |
| 6,816,343 B1 | 11/2004 | Oveyssi | |
| 6,825,622 B1 | 11/2004 | Ryan et al. | |
| 6,826,009 B1 | 11/2004 | Scura et al. | |
| 6,831,810 B1 | 12/2004 | Butler et al. | |
| 6,831,811 B1 | 12/2004 | Andrikowich et al. | |
| 6,839,199 B1 | 1/2005 | Alexander, Jr. et al. | |
| 6,844,996 B1 | 1/2005 | Berding et al. | |
| 6,847,504 B1 | 1/2005 | Bennett et al. | |
| 6,847,506 B1 | 1/2005 | Lin et al. | |
| 6,856,491 B1 | 2/2005 | Oveyssi | |
| 6,856,492 B2 | 2/2005 | Oveyssi | |
| 6,862,154 B1 | 3/2005 | Subrahmanyam et al. | |
| 6,862,156 B1 | 3/2005 | Lin et al. | |
| 6,862,176 B1 | 3/2005 | Codilian et al. | |
| 6,865,049 B1 | 3/2005 | Codilian et al. | |
| 6,865,055 B1 | 3/2005 | Ou-Yang et al. | |
| 6,867,946 B1 | 3/2005 | Berding et al. | |
| 6,867,950 B1 | 3/2005 | Lin | |
| 6,876,514 B1 | 4/2005 | Little | |
| 6,879,466 B1 | 4/2005 | Oveyssi et al. | |
| 6,888,697 B1 | 5/2005 | Oveyssi | |
| 6,888,698 B1 | 5/2005 | Berding et al. | |
| 6,891,696 B1 | 5/2005 | Ou-Yang et al. | |
| 6,898,052 B1 | 5/2005 | Oveyssi | |
| 6,900,961 B1 | 5/2005 | Butler | |
| 6,906,880 B1 | 6/2005 | Codilian | |
| 6,906,897 B1 | 6/2005 | Oveyssi | |
| 6,908,330 B2 | 6/2005 | Garrett et al. | |
| 6,922,308 B1 | 7/2005 | Butler | |
| 6,930,848 B1 | 8/2005 | Codilian et al. | |
| 6,930,857 B1 | 8/2005 | Lin et al. | |
| 6,934,126 B1 | 8/2005 | Berding et al. | |
| 6,937,444 B1 | 8/2005 | Oveyssi | |
| 6,940,698 B2 | 9/2005 | Lin et al. | |
| 6,941,642 B1 | 9/2005 | Subrahmanyam et al. | |
| 6,947,251 B1 | 9/2005 | Oveyssi et al. | |
| 6,950,275 B1 | 9/2005 | Ali et al. | |
| 6,950,284 B1 | 9/2005 | Lin | |
| 6,952,318 B1 | 10/2005 | Ngo | |
| 6,954,329 B1 | 10/2005 | Ojeda et al. | |
| 6,958,884 B1 | 10/2005 | Ojeda et al. | |
| 6,958,890 B1 | 10/2005 | Lin et al. | |
| 6,961,212 B1 | 11/2005 | Gustafson et al. | |
| 6,961,218 B1 | 11/2005 | Lin et al. | |
| 6,963,469 B1 | 11/2005 | Gustafson et al. | |
| 6,965,500 B1 | 11/2005 | Hanna et al. | |
| 6,967,800 B1 | 11/2005 | Chen et al. | |
| 6,967,804 B1 | 11/2005 | Codilian | |
| 6,970,329 B1 | 11/2005 | Oveyssi et al. | |
| 6,972,924 B1 | 12/2005 | Chen et al. | |
| 6,972,926 B1 | 12/2005 | Codilian | |
| 6,975,476 B1 | 12/2005 | Berding | |
| 6,979,931 B1 | 12/2005 | Gustafson et al. | |
| 6,980,391 B1 | 12/2005 | Haro | |
| 6,980,401 B1 | 12/2005 | Narayanan et al. | |
| 6,982,853 B1 | 1/2006 | Oveyssi et al. | |
| 6,989,953 B1 | 1/2006 | Codilian | |
| 6,990,727 B1 | 1/2006 | Butler et al. | |
| 6,996,893 B1 | 2/2006 | Ostrander et al. | |
| 7,000,309 B1 | 2/2006 | Klassen et al. | |
| 7,006,324 B1 | 2/2006 | Oveyssi et al. | |
| 7,013,731 B1 | 3/2006 | Szeremeta et al. | |
| 7,031,104 B1 | 4/2006 | Butt et al. | |
| 7,035,053 B1 | 4/2006 | Oveyssi et al. | |
| 7,050,270 B1 | 5/2006 | Oveyssi et al. | |
| 7,057,852 B1 | 6/2006 | Butler et al. | |
| 7,062,837 B1 | 6/2006 | Butler | |
| 7,064,921 B1 | 6/2006 | Yang et al. | |
| 7,064,922 B1 | 6/2006 | Alfred et al. | |
| 7,064,932 B1 | 6/2006 | Lin et al. | |
| 7,085,098 B1 | 8/2006 | Yang et al. | |
| 7,085,108 B1 | 8/2006 | Oveyssi et al. | |
| 7,092,216 B1 | 8/2006 | Chang et al. | |
| 7,092,251 B1 | 8/2006 | Henry | |
| 7,099,099 B1 | 8/2006 | Codilian et al. | |
| 7,113,371 B1 | 9/2006 | Hanna et al. | |
| 7,142,397 B1 | 11/2006 | Venk | |
| 7,145,753 B1 | 12/2006 | Chang et al. | |
| RE39,478 E | 1/2007 | Hatch et al. | |
| 7,161,768 B1 | 1/2007 | Oveyssi | |
| 7,161,769 B1 | 1/2007 | Chang et al. | |
| 7,180,711 B1 | 2/2007 | Chang et al. | |
| 7,193,819 B1 | 3/2007 | Chen et al. | |
| 7,209,317 B1 | 4/2007 | Berding et al. | |
| 7,209,319 B1 | 4/2007 | Watkins et al. | |
| D542,289 S | 5/2007 | Diebel | |
| 7,212,377 B1 | 5/2007 | Ou-Yang et | |
| 7,215,513 B1 | 5/2007 | Chang et al. | |
| 7,215,514 B1 | 5/2007 | Yang et al. | |
| 7,224,551 B1 | 5/2007 | Ou-Yang et al. | |
| D543,981 S | 6/2007 | Diebel | |
| 7,227,725 B1 | 6/2007 | Chang et al. | |
| 7,239,475 B1 | 7/2007 | Lin et al. | |

(56) References Cited

U.S. PATENT DOCUMENTS

| | | | |
|---|---|---|---|
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,352,536 B2 * | 4/2008 | Kim .......... 360/265.6 |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,570,454 B1 | 8/2009 | Andrikowich et al. |
| 7,570,460 B2 * | 8/2009 | Kitahori et al. .......... 360/265.6 |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,826,177 B1 | 11/2010 | Zhang et al. |
| 7,852,601 B1 | 12/2010 | Little |
| 7,864,488 B1 | 1/2011 | Pan |
| 7,876,526 B2 | 1/2011 | Calderon et al. |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,914,858 B1 | 3/2011 | deJesus et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,089,721 B1 * | 1/2012 | Andrikowich et al. .... 360/99.22 |
| 8,100,017 B1 | 1/2012 | Blick et al. |
| 8,102,620 B2 * | 1/2012 | Martino .......... 360/97.12 |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,199,425 B1 | 6/2012 | Gustafson et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,724 B2 | 8/2012 | Hayakawa et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,307,537 B1 * | 11/2012 | Klassen et al. .......... 29/603.03 |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 2002/0127085 A1 | 9/2002 | Field |
| 2011/0212281 A1 | 9/2011 | Jacoby et al. |
| 2012/0097879 A1 | 4/2012 | Gilbert |

(56) References Cited

U.S. PATENT DOCUMENTS

| | | |
|---|---|---|
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

* cited by examiner

US 9,025,284 B1

DISK DRIVE WITH SELF SEALING SCREW ATTACHMENT OF ACTUATOR PIVOT

CROSS-REFERENCE TO RELATED APPLICATION

This application claims priority to provisional U.S. Patent Application Ser. No. 61/944,647, filed on Feb. 26, 2014, which is incorporated herein in its entirety.

BACKGROUND

Disk drives are a type of information storage device that store information on at least one spinning disk. Other types of information storage devices include, for example, magnetic tape drives which retrieve stored information on magnetic tape (e.g. linear tape drive, helical scan tape drive). There are several types of disk drives. Magnetic hard disk drives typically store information on non-removable rigid magnetic disks, mounted on the rotatable hub of a spindle that is attached to a disk drive base. There are also optical disk drives, which typically retrieve information stored on removable optical disk media. Also for example, there are magneto-optical disk drives, which share some of the characteristics of optical disk drives and magnetic hard disk drives.

All types of disk drives typically include a head actuator, for example one that is pivotably mounted on the disk drive base. A head actuator may include a pivot bearing that allows the actuator to pivot about a pivot bearing shaft that is attached to the disk drive base. Certain modem disk drives are also designed to enclose a gas other than air, for example helium. However, helium can be difficult to contain for periods of time commensurate with the expected lifetime of a disk drive.

Conventional structures and methods to attach the pivot bearing shaft to the disk drive base have had one or more disadvantages. For example, pivot bearing shafts that protrude from the disk drive base (e.g. machined from the disk drive base material or press fit into a hole in the disk drive base) may have inadequate stiffness that can lead to undesirably low resonance frequencies in the actuator positioning structure. Also for example, pivot bearing shafts that screw into the disk drive base from above may generate particulate debris during assembly, when the pivot bearing shaft is torqued onto the disk drive base, and mating surfaces of the two components are thereby rubbed together.

Hence there is a need in the art for improved structures and methods to attach a pivot bearing shaft to a disk drive base, that can avoid contamination of the disk drive enclosure during assembly, provide adequate stiffness and high enough resonance frequencies for actuator positioning structure performance, and/or facilitate sealing of an alternative gas within the disk drive enclosure. There is a particular need in the art for such improved structures and methods, if they are also practical enough to be suitable for high volume disk drive manufacturing operations, allow possible rework of assembled disk drives prior to or after shipment, and/or are inexpensive enough to avoid disadvantage in the very competitive consumer electronics industry.

DESCRIPTION OF THE PREFERRED EMBODIMENTS

Figure 1:
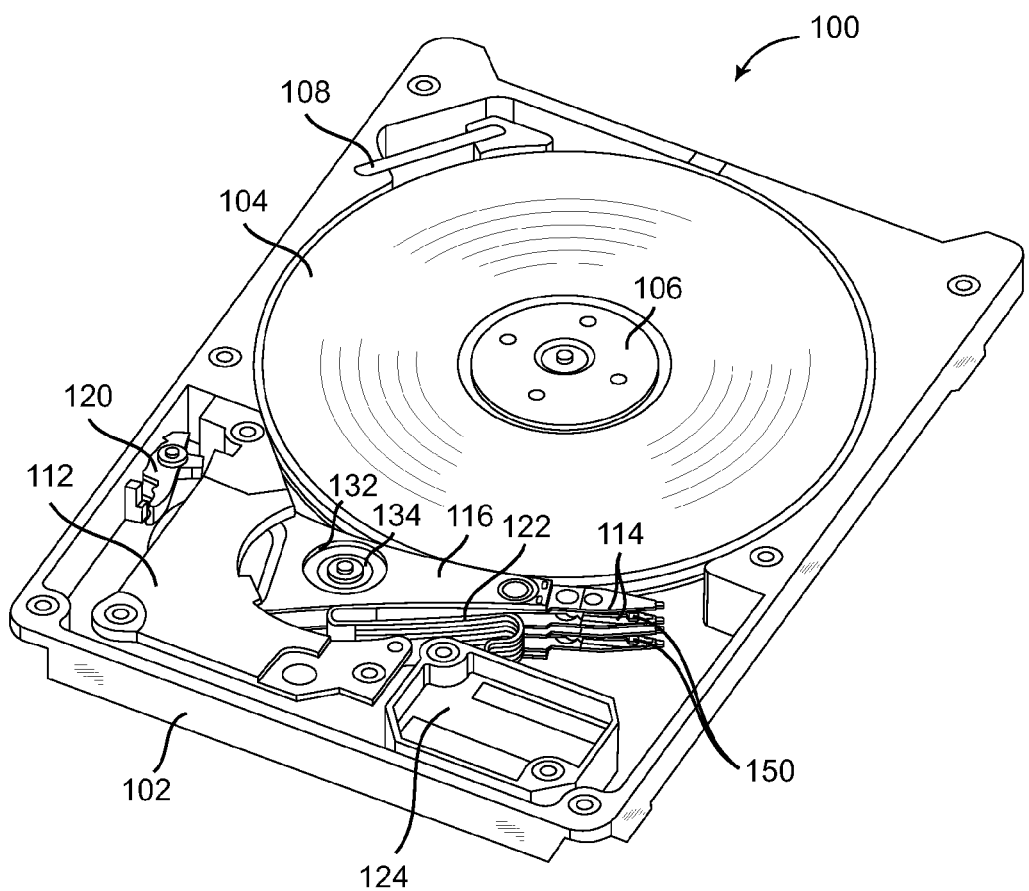
FIG. 1 is a perspective view of a disk drive capable of including an embodiment of the present invention.

FIG. 1 is a perspective view of a disk drive 100 capable of including an embodiment of the present invention. The disk drive 100 includes a disk drive base 102, and a disk drive cover (not shown to better depict internal disk drive components), that together form a disk drive enclosure. At least one disk 104 is rotatably mounted on a spindle 106 that is attached to the disk drive base 102. Each disk 104 includes two major annular surfaces that may include one or more data areas for storing written data. The disk drive 100 may also include a head actuator 116 for positioning one or more head gimbal assemblies 114 at desired positions over the major surfaces of the disk 104, for reading and/or writing of data by one or more heads 150.

The head actuator 116 may be pivotably attached to the disk drive base 102 by an actuator pivot bearing 134 that is disposed within a cylindrical bore 132 of the head actuator 116. The head actuator 116 may be rotated about the actuator pivot 134 by a voice coil motor 112 that includes permanent magnets that interact with an electrical current passed through a conductive coil on the head actuator 116. The disk drive 100 may include a crash stop and/or latch 120 to secure and/or prevent extreme or undesired rotation of the head actuator 116, for example to protect the head gimbal assemblies 114 or the heads 150 from mechanical impacts or shocks.

Each head 150 may include a magnetoresistive read transducer and may be referred to as a "read head." However, the read head 150 may also include structures that perform functions other than merely reading data (e.g., an inductive writer for writing data, microactuator for fine data track following, heater for dynamic control of head-disk separation, etc.). Read or write signals, to or from the heads 150, may be carried by a flexible cable 122 attached to the head actuator 116 and extending to a connector 124.

In the embodiment of FIG. 1, the disk drive 100 may include a recirculation filter 108 to help control any contaminates that enter the disk drive 100, for example during disk drive assembly and/or by creation by internal components of the disk drive 100 during its operation. The disk drive 100 may also be sealed to prevent entry by external contaminants, and may further be hermetically sealed to retain a gas other than air (e.g. helium, nitrogen, methane, air, argon, neon, etc.) that may be desirable for operation and/or testing of the disk drive 100. If the interior of the disk drive enclosure contains a substantial concentration of that gas, the disk drive 100 would be considered to be "filled" with that gas. For example, if the interior of the disk drive enclosure then contains a substantial concentration of helium, the disk drive 100 would be considered to be helium-filled.

Practically, the concentration of an enclosed gas (e.g. helium) versus remaining air will be less than 100% initially, and would be expected to drop over the useful life of the disk drive 100 due to non-zero leakage. In certain applications, it may be desirable for at least 70% of the helium gas that is initially enclosed to remain enclosed after a 10 year useful life of the hermetically sealed disk drive. Still, in the case of helium, the disk drive 100 may be considered helium-filled throughout its useful life so long as it continues to enclose a substantial concentration of helium gas. Note also that 1.0 atmosphere pressure of helium is not required for the disk drive 100 to be considered to enclose helium and/or be helium-filled. For example, a helium-filled disk drive enclosure may preferably initially enclose helium having between 0.3 to 1.0 atmosphere partial pressure, and may also enclose air having between 0 to 0.7 atmosphere partial pressure.

Figure 2A:
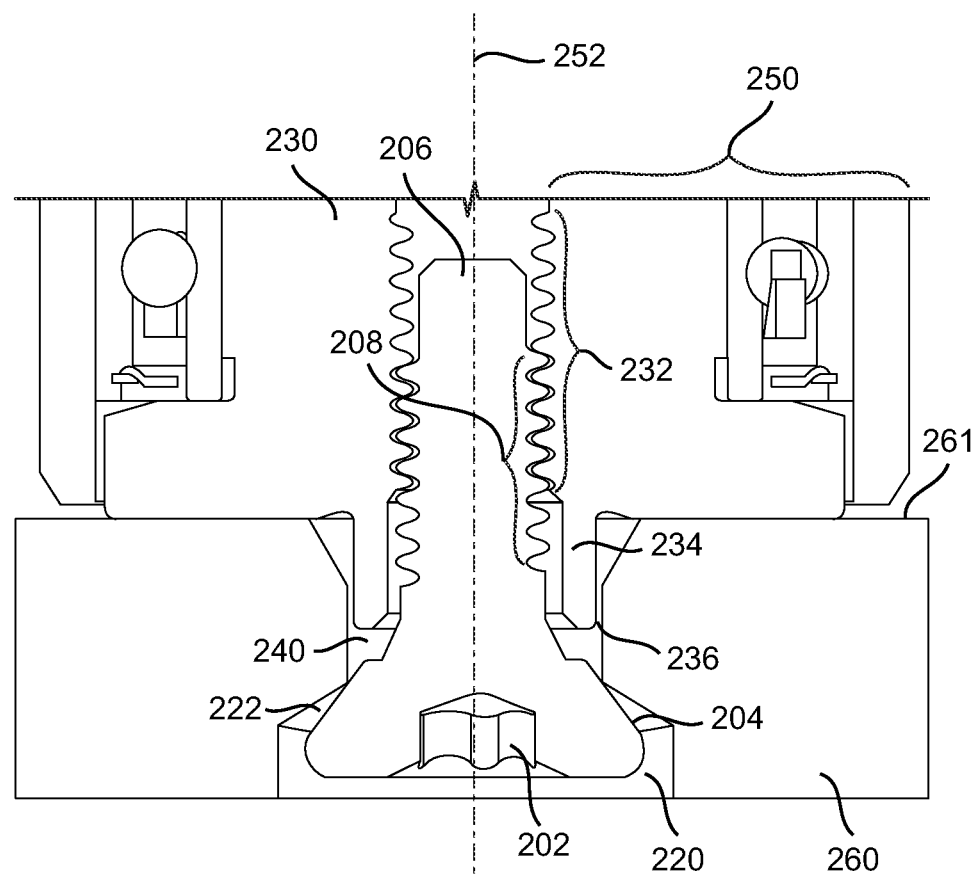
FIG. 2A is a cross-sectional view of a self-sealing actuator pivot attachment for a disk drive, according to an embodiment of the present invention.
Figures 2B, 3A:
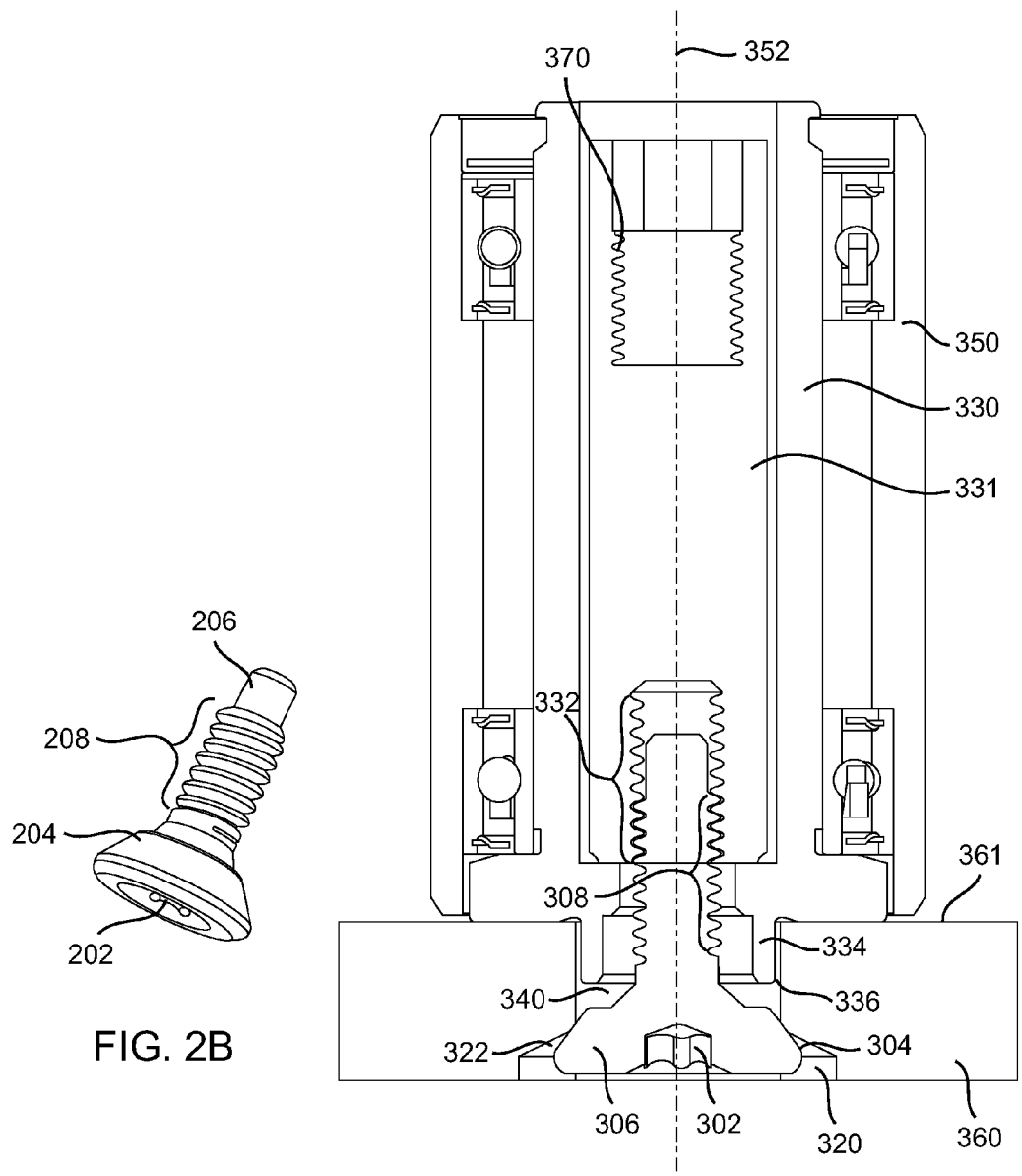
FIG. 2B is a perspective view of a screw suitable for use in an embodiment of the present invention.
FIG. 3A is a cross-sectional view of a self-sealing actuator pivot attachment for a disk drive, according to another embodiment of the present invention.

FIG. 2A is a cross-sectional view of a self-sealing actuator pivot attachment for a disk drive, according to an embodiment of the present invention. FIG. 2B is a perspective view of a screw 206 suitable for use in the embodiment of FIG. 2A. Now referring to FIGS. 2A and 2B, the upwards-oriented screw 206 includes an externally threaded section 208 and an external annular seating surface 204. The external annular seating surface 204 of the screw 206 may optionally be a beveled (i.e. linearly tapered in cross-section) surface or alternatively a curved (e.g. spherical) surface. In this context, the term "annular" excludes a threaded surface (e.g. the threads of the externally threaded section 208, because an annulus must rejoin itself in a complete circle when traveling around 360 degrees, while a thread is helical or spiral in shape and so does not rejoin itself when traveling around 360 degrees. Note that in this context a spherical surface does not have to be part of a complete sphere, and indeed in this embodiment could not practically be part of a complete sphere. The screw 206 also optionally includes a faceted torque-receiving recession 202, which in the embodiment of FIGS. 2A and 2B, is optionally a blind star shaped or hexagonal recession.

In the embodiment of FIG. 2A, the external annular seating surface 204 of the screw 206 contacts with and forms a continuous annular seal with a mating internal annular seating surface 222 of a hole 220 in a disk drive base 260. In such position, the contact of the external annular seating surface 204 of the screw 206 with the internal annular seating surface 222 of the hole 220 of the disk drive base 260, may prevent flow of gas (e.g. helium, nitrogen, methane, air, argon, neon, etc.). After the screw 206 is installed and tightened, as shown in FIG. 2A, a further metal foil seal optionally may be positioned over the hole 220 and the screw 206 and adhered to an outer surface of the disk drive base 260. Such an adhered seal optionally may comprise a polymer backing layer and a metal film deposited on the polymer backing layer, with a thermal set epoxy adhesive layer or an acrylic pressure sensitive adhesive layer for attachment to the disk drive base 260, for example.

In the embodiment of FIG. 2A, the screw 206 secures a pivot shaft 230 of an actuator pivot bearing 250 to the disk drive base 260. Specifically, the pivot bearing shaft 230 includes a lower internally threaded section 232, that is aligned with a pivot axis 252 of the head actuator, and that engages with the external threads of the externally threaded section 208 of the screw 206. The pivot bearing shaft 230 seats flatly on an upper surface 261 of the disk drive base 260 and is in preloaded contact therewith, which can advantageously enhance stiffness of the attachment. In this context, the preloaded contact is an annular contact area in compressive contact, preloaded by the screw 206 being tightened. The increased stiffness of such seating may advantageously increase actuator resonance frequencies in certain embodiments.

Also in the embodiment of FIG. 2A, because tightening the bottom-up screw 206 preloads the seating surface of the pivot bearing shaft 230 against the top surface 261 of the disk drive base 260, the pivot bearing shaft 230 itself does not need to be rotated against the disk drive base 260 during assembly. This can reduce or prevent the generation of particulate contamination within the disk drive enclosure (e.g. particles of the disk drive base 260 being sheared off by rotation of the pivot bearing shaft 230 during assembly). Note that the actuator pivot bearing shaft 230 may be fabricated from series 300 stainless steel in certain embodiments, while the disk drive base 260 may be fabricated from a softer and more easily machined material such as aluminum.

Also in the embodiment of FIGS. 2A and 2B, the external annular seating surface 204 of the screw 206 is torqued into place against the internal annular seating surface 222 of the hole 220 of the disk drive base 260. The narrow annular contact between the external annular seating surface 204 of the screw 206, and the internal annular seating surface 222 of the hole 220 of the disk drive base 260, gets burnished and/or compressed when torqued tight, which may form a gas-tight seal around the head of the screw 206.

In this way, tightening the screw 206 to attach the actuator pivot bearing 250 may also serve to "self-seal" the hole 220 through the disk drive base 260 (through which the screw 206 passes). Such a metal-to-metal seal, torqued to sufficient compression, can form a gas-tight seal that, in certain embodiments, can help retain helium (or another alternative gas) within the disk drive enclosure for the expected lifetime of the disk drive. For example, in certain embodiments a screw torque of 2 to 6 in-lb may burnish the internal annular seating surface 222 of the hole 220 of the disk drive base 260 sufficiently to prevent helium leakage exceeding 1E-08 atm-cc/sec.

In the embodiment of FIGS. 2A and 2B, when the screw 206 is torqued tight, particulate debris can be generated (e.g. by the burnishing mentioned previously herein). Note that the screw 206 may be fabricated from series 400 stainless steel, for example, which may be a harder material than that of the disk drive base 260 (e.g. an aluminum alloy). However, because of the geometry of the actuator pivot attachment of FIG. 2A, such particulate debris are created either outside of the disk drive enclosure (i.e. below the disk drive base 260 shown in FIG. 2A), or else are trapped within a small space 240 above the head of the bottom-up screw 206 but below the pivot bearing shaft 230. Such trapped particulate debris cannot pass between the pivot bearing shaft 230 and the base 260 to enter the rest of the disk drive enclosure, and therefore may advantageously prevent such debris from contaminating the head-disk interface, for example.

In the embodiment of FIGS. 2A and 2B, the pivot bearing shaft 230 further comprises an annular boss 234 that extends into the hole 220. In certain embodiments, a cylindrical outer surface of the annular boss 234 may be in slip fit contact with the hole 220. However, in the embodiment shown in FIG. 2A, the cylindrical outer surface of the annular boss 234 is radially separated from the hole 220 by a clearance 236, so that the screw 206 may be self-centering. In the embodiment of FIG. 2A, the pivot bearing shaft 230 is a single component having material continuity rather than being an assembly of subcomponents. However, in an alternative embodiment, the pivot bearing shaft may comprise an assembly of nested subcomponents.

In the embodiment of FIG. 2A, the angle of the taper of the internal annular seating surface 222 of the hole 220 of the disk drive base 260 may preferably be substantially different from the angle of the beveled external annular seating surface 204 of the screw 206. In certain embodiments, such a substantial angular difference may be preferred so that the region of annular contact between the external annular seating surface 204 of the screw 206 and the disk drive base 260 is sufficiently narrow (e.g. starting as a line contact and then widening by some small desired amount as the screw 206 is tightened to the specified torque)—e.g. a narrow enough annular contact area to ensure that the compressive contact pressure between the external annular seating surface 204 of the screw 206 and the disk drive base 260 is high enough for adequate sealing. The angular difference may be specified based on a relationship between the Young's modulus of the material of the disk drive base 260, the thread pitch of the bottom-up screw 206, and the practical specified torque to be applied to the screw 206 during disk drive assembly.

Note also that the embodiment of FIG. 2A may advantageously allow rework in certain disk drive assembly and testing processes, for example because the screw 206 and disk drive base 260 may not be unacceptably degraded by repeated removal and re-torqueing. Such advantage may not be shared by certain prior art sealing methods, such as those that rely upon adhering a thin metal foil seal. In certain embodiments, assembly and/or rework may be further enhanced by coating the threads of the screw 206 with a lubricant (e.g. a conventional solid lubricant).

Figure 3B:
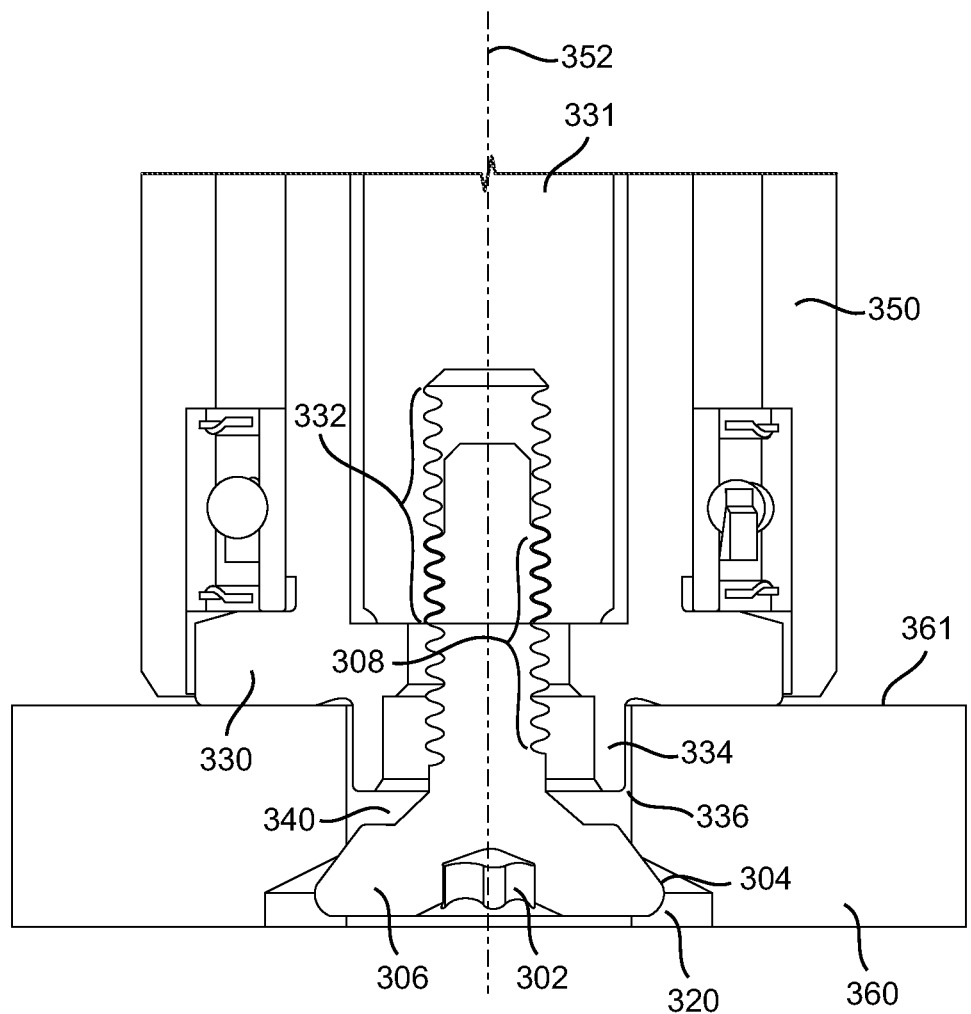
FIG. 3B is an expanded view of a portion of the cross section of FIG. 3A.

FIG. 3A is a cross-sectional view of a self-sealing actuator pivot attachment for a disk drive, according to another embodiment of the present invention. FIG. 3B is an expanded view of a portion of the cross section of FIG. 3A. Now referring to FIGS. 3A and 3B, the upwards-oriented screw 306 includes an externally threaded section 308 and an external annular seating surface 304. The external annular seating surface 304 of the screw 306 may optionally be a beveled (i.e. linearly tapered in cross-section) surface or alternatively a curved (e.g. spherical) surface. In this context, the term "annular" excludes a threaded surface (e.g. the threads of the externally threaded section 308, because an annulus must rejoin itself in a complete circle when traveling around 360 degrees, while a thread is helical or spiral in shape and so does not rejoin itself when traveling around 360 degrees. The screw 306 also optionally includes a faceted torque-receiving recession 302, which in the embodiment of FIGS. 3A and 3B is a blind star shaped or hexagonal recession.

In the embodiment of FIGS. 3A and 3B, the external annular seating surface 304 of the screw 306 contacts with and forms a continuous annular seal with a mating internal annular seating surface 322 of a hole 320 in a disk drive base 360. In such position, the contact of the external annular seating surface 304 of the screw 306 with the internal annular seating surface 322 of the hole 320 of the disk drive base 360, may prevent flow of gas (e.g. helium, nitrogen, methane, air, argon, neon, etc.). After the screw 306 is installed and tightened, as shown in FIGS. 3A and 3B, a further metal foil seal optionally may be positioned over the hole 320 and the screw 306 and adhered to an outer surface of the disk drive base 360. Such an adhered seal optionally may comprise a polymer backing layer and a metal film deposited on the polymer backing layer, with a thermal set epoxy adhesive layer or an acrylic pressure sensitive adhesive layer for attachment to the disk drive base 360, for example.

In the embodiment of FIGS. 3A and 3B, the actuator pivot attachment structure includes a pivot bearing shaft 330, 331 that includes an outer shaft component 330 that is aligned with the pivot axis 352 of the head actuator and that includes an annular boss 334. The pivot bearing shaft 330, 331 also includes an inner shaft component 331 that includes a lower internally threaded section 332 that engages with the external threads of the externally threaded section 308 of the screw 306. In the embodiment of FIGS. 3A and 3B, the inner shaft component 331 is nested within the outer shaft component 330. This structure may advantageously provide additional radial clearances that may allow the screw 306 to self-center to further enhance sealing. The embodiment of FIGS. 3A and 3B otherwise has several similarities to the embodiment of FIGS. 2A and 2B.

Referring again to the embodiment of FIGS. 3A and 3B, the inner shaft component 331 of the pivot bearing shaft 330, 331 optionally further comprises an upper internally threaded section 370 that is configured to be coupled to a conventional disk drive cover by a conventional screw. By contrast, the upwards-oriented screw 306 secures the pivot bearing shaft 330, 331 to the disk drive base 360. The outer shaft component 330 seats flatly on an upper surface 361 of the disk drive base 360 and is in preloaded contact therewith, which can advantageously enhance stiffness of the attachment. In this context, the preloaded contact is an annular contact area in compressive contact, preloaded by the screw 306 being tightened. The increased stiffness of such seating may advantageously increase actuator resonance frequencies in certain embodiments.

Also in the embodiment of FIGS. 3A and 3B, because tightening the bottom-up screw 306 preloads the seating surface of the outer shaft component 330 against the top surface 361 of the disk drive base 360, the outer shaft component 330 itself does not need to be rotated against the disk drive base 360 during assembly. This can reduce or prevent the generation of particulate contamination within the disk drive enclosure (e.g. particles of the disk drive base 360 being sheared off by rotation of the pivot bearing shaft 330, 331 during assembly). Note that the actuator pivot bearing shaft 330, 331 may be fabricated from series 300 stainless steel in certain embodiments, while the disk drive base 360 may be fabricated from a softer and more easily machined material such as aluminum.

Also in the embodiment of FIGS. 3A and 3B, the external annular seating surface 304 of the screw 306 is torqued into place against the internal annular seating surface 322 of the hole 320 of the disk drive base 360. The narrow annular contact between the external annular seating surface 304 of the screw 306, and the internal annular seating surface 322 of the hole 320 of the disk drive base 360, gets burnished and/or compressed when torqued tight, which may form a gas-tight seal around the head of the screw 306.

In this way, tightening the screw 306 to attach the actuator pivot bearing 350 may also serve to "self-seal" the hole 320 through the disk drive base 360 (through which the screw 306 passes). Such a metal-to-metal seal, torqued to sufficient compression, can form a gas-tight seal that, in certain embodiments, can help retain helium (or another alternative gas) within the disk drive enclosure for the expected lifetime of the disk drive. For example, in certain embodiments a screw torque of 2 to 6 in-lb may burnish the internal annular seating surface 322 of the hole 320 of the disk drive base 360 sufficiently to prevent helium leakage exceeding 1E-08 atm-cc/sec.

In the embodiment of FIGS. 3A and 3B, when the screw 306 is torqued tight, particulate debris can be generated (e.g. by the burnishing mentioned previously herein). Note that the screw 306 may be fabricated from series 400 stainless steel, for example, which may be a harder material than that of the disk drive base 360 (e.g. an aluminum alloy). However, because of the geometry of the actuator pivot attachment of FIGS. 3A and 3B, such particulate debris are created either outside of the disk drive enclosure (i.e. below the disk drive base 360 shown in FIGS. 3A and 3B), or else are trapped within a small space 340 above the head of the bottom-up screw 306 but below the pivot bearing shaft 330, 331. Such trapped particulate debris cannot pass between the pivot bearing shaft 330, 331 and the base 360 to enter the rest of the disk drive enclosure, and therefore may advantageously prevent such debris from contaminating the head-disk interface, for example.

In the embodiment of FIGS. 3A and 3B, the pivot bearing outer shaft component 330 further comprises the annular boss 334 that extends into the hole 320. In certain embodiments, a cylindrical outer surface of the annular boss 334 may be in slip fit contact with the hole 320. However, in the embodiment shown in FIGS. 3A and 3B, the cylindrical outer surface of the annular boss 334 is radially separated from the hole 320 by a clearance 336, so that the screw 306 may be self-centering.

In the embodiment of FIGS. 3A and 3B, the angle of the taper of the internal annular seating surface 322 of the hole 320 of the disk drive base 360 may preferably be substantially different from the angle of the beveled external annular seating surface 304 of the screw 306. In certain embodiments, such a substantial angular difference may be preferred so that the region of annular contact between the external annular seating surface 304 of the screw 306 and the disk drive base 360 is sufficiently narrow (e.g. starting as a line contact and then widening by some small desired amount as the screw 306 is tightened to the specified torque)—e.g. a narrow enough annular contact area to ensure that the compressive contact pressure between the external annular seating surface 304 of the screw 306 and the disk drive base 360 is high enough for adequate sealing. The angular difference may be specified based on a relationship between the Young's modulus of the material of the disk drive base 360, the thread pitch of the bottom-up screw 306, and the practical specified torque to be applied to the screw 306 during disk drive assembly.

Note also that the embodiment of FIGS. 3A and 3B may advantageously allow rework in certain disk drive assembly and testing processes, for example because the screw 306 and disk drive base 360 may not be unacceptably degraded by repeated removal and re-torqueing. Such advantage may not be shared by certain prior art sealing methods, such as those that rely upon adhering a thin metal foil seal. In certain embodiments, assembly and/or rework may be further enhanced by coating the threads of the screw 306 with a lubricant (e.g. a conventional solid lubricant).

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A disk drive comprising:
    a disk drive enclosure including a disk drive base and a disk drive cover, the disk drive base including a first hole therethrough, the first hole including an internal annular seating surface;
    a head actuator within the disk drive enclosure, the head actuator pivotably attached to the disk drive base by an actuator pivot bearing, the actuator pivot bearing including
        a pivot bearing shaft disposed within a bore of the head actuator, the pivot bearing shaft including a lower internally threaded section aligned with a pivot axis of the head actuator, the pivot bearing shaft having a flat annular support surface that is facing and in preloaded contact with a flat mating surface of the disk drive base around the first hole;
        a bearing member disposed around the pivot bearing shaft and between the pivot bearing shaft and the bore of the actuator; and
        a first screw having an externally threaded section that is engaged with the lower internally threaded section of the pivot bearing shaft, the first screw having a screw head with an external annular seating surface in contact with and forming a continuous annular seal with the internal annular seating surface of the first hole.

2. The disk drive of claim 1 wherein the external annular seating surface of the screw head is a beveled surface.

3. The disk drive of claim 1 wherein the pivot bearing shaft comprises series 300 stainless steel.

4. The disk drive of claim 1 wherein the internal annular seating surface of the first hole is a beveled surface.

5. The disk drive of claim 1 wherein the first screw comprises series 400 stainless steel.

6. The disk drive of claim 1 wherein the disk drive base comprises aluminum.

7. The disk drive of claim 1 wherein the pivot bearing shaft further comprises an upper internally threaded section coupled to the disk drive cover by a second screw.

8. The disk drive of claim 1 wherein the pivot bearing shaft further comprises an annular boss that extends into the first hole.

9. The disk drive of claim 8 wherein the cylindrical outer surface of the annular boss is in slip fit contact with the first hole.

10. The disk drive of claim 8 wherein the cylindrical outer surface of the annular boss is radially separated from the first hole by a clearance, so that the first screw is self-centering.

11. The disk drive of claim 8 wherein the pivot bearing shaft comprises an outer shaft component that includes the annular boss, and an inner shaft component that includes the lower internally threaded section, the inner shaft component being nested within the outer shaft component.

12. The disk drive of claim 1 wherein the pivot bearing shaft is a single component having material continuity rather than being an assembly of subcomponents.

13. The disk drive of claim 1 wherein the disk drive enclosure is helium-filled.

14. The disk drive of claim 1 further comprising a spindle motor attached to the disk drive base, and a disk mounted to a rotatable hub of the spindle motor within the disk drive enclosure.

* * * * *